(12) United States Patent
Green et al.

(10) Patent No.: US 11,920,002 B2
(45) Date of Patent: *Mar. 5, 2024

(54) ZWITTERIONIC POLY(SULFOBETAINE ARYLENE ETHER SULFONE) POLYMER SYNTHESIS ROUTE AND APPLICATIONS FOR DESALINATION MEMBRANES

(71) Applicant: Arizona Board of Regents on behalf of Arizona State University, Scottsdale, AZ (US)

(72) Inventors: Matthew Green, Phoenix, AZ (US); Yi Yang, Mesa, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/985,288

(22) Filed: Nov. 11, 2022

(65) Prior Publication Data

US 2023/0086952 A1     Mar. 23, 2023

Related U.S. Application Data

(63) Continuation of application No. 16/374,501, filed on Apr. 3, 2019, now Pat. No. 11,499,013.

(60) Provisional application No. 62/652,209, filed on Apr. 3, 2018.

(51) Int. Cl.
| | | |
|---|---|---|
| C08G 75/23 | (2006.01) | |
| B01D 71/68 | (2006.01) | |
| C02F 1/44 | (2023.01) | |
| C02F 103/08 | (2006.01) | |
| C08G 65/40 | (2006.01) | |
| C08L 81/06 | (2006.01) | |

(52) U.S. Cl.
CPC ............. *C08G 75/23* (2013.01); *B01D 71/68* (2013.01); *C02F 1/44* (2013.01); *C08L 81/06* (2013.01); *C02F 2103/08* (2013.01); *C08G 65/4056* (2013.01)

(58) Field of Classification Search
CPC .... C08G 75/23; C08G 65/4056; B01D 71/68; C02F 1/44; C02F 2103/08; C08L 81/06
See application file for complete search history.

(56) References Cited

U.S. PATENT DOCUMENTS

2019/0300653 A1    10/2019  Green et al.

OTHER PUBLICATIONS

Al-Omran et al. "Synthesis and Sulfonation of Poly(Phenylene Ether Sulfone)s Containing Methylated Hydroquinone Residues". Polymer vol. 37 No. 9, pp. 1735-1743. (1996).
Bellona et al., "Factors affecting the rejection of organic solutes during NF/RO treatment—A literature review," Water Res. 38 (2004) pp. 2795-2809. doi: 10.1016/j.watres.2004.03.034.
Bengani-Lutz et al., "Self-Assembling Zwitterionic Copolymers as Membrane Selective Layers with Excellent Fouling Resistance: Effect of Zwitterion Chemistry," ACS Appl. Mater. Interfaces. 9 (2017) 20859-20872. doi:10.1021/acsami.7b04884.

(Continued)

*Primary Examiner* — Shane Fang
(74) *Attorney, Agent, or Firm* — Fish & Richardson P.C.

(57) ABSTRACT

A zwitterionic polysulfone formed from an allyl-containing monomer, a phenol-containing monomer, and an aryl-halide-containing monomer. The zwitterionic polysulfone may be incorporated into a desalination membrane.

19 Claims, 8 Drawing Sheets

(56) References Cited

OTHER PUBLICATIONS

Callow et al., "Trends in the development of environmentally friendly fouling-resistant marine coatings," Nat. Commun. 2 (2011) 244. doi:10.1038/ncomms1251.
Cassady et al., Specific ion effects on the permselectivity of sulfonated poly(ether sulfone) cation exchange membranes, J. Memb. Sci. 508 (2016) 146-152. doi:10.1016/j.memsci.2016.02.048.
Chede et al., "Desalination using low biofouling nanocomposite membranes: From batch-scale to continuous-scale membrane fabrication," Desalination. vol. 451, (2019), pp. 81-91.
Cheng et al., "Inhibition of bacterial adhesion and biofilm formation on zwitterionic surfaces," Biomaterials. 28 (2007) 4192-4199. doi:10.1016/j.biomaterials.2007.05.041.
Chiang et al., "A facile zwitterionization in the interfacial modification of low bio-fouling nanofiltration membranes," J. Memb. Sci. 389 (2012) 76-82. doi:10.1016/j.memsci.2011.10.017.
Cohen-Tanugi et al., "Quantifying the potential of ultra-permeable membranes for water desalination," Energy Environ. Sci. 7 (2014) 1134-1141. doi:10.1039/C3EE43221A.
Colby "Structure and linear viscoelasticity of flexible polymer solutions: comparison of polyelectrolyte and neutral polymer solutions," Rheol Acta, 2010, 49, pp. 425-442, Dec. 29, 2009.
Dennis et al., "Synthesis and characterization of polysulfone-containing poly(butylene terephthalate) segmented block copolymers," Macromolecules. 47 (2014) 8171-8177. doi:10.1021/ma501903h.
Deshmukh et al., "Desalination by forward osmosis: Identifying performance limiting parameters through module-scale modeling," J. Memb. Sci. 491 (2015) 159-167. doi:10.1016/j.memsci.2015.03.080.
Escobar et al., "Microfiltration and ultrafiltration membrane science and technology," J. Appl. Polym. Sci. 132 (2015). doi:10.1002/app.42002.
Geise et al., "Water permeability and water/salt selectivity tradeoff in polymers for desalination," J. Memb. Sci. 369 (2011) 130-138. doi:10.1016/j.memsci.2010.11.054.
Hunley et al. "Electrospinning functional nanoscale fibers: a perspective for the future," Poly. Int. 57(3), pp. 385-389. May 29, 2007.
Imbrogno et al., "Critical aspects of RO desalination: A combination strategy," Desalination. 401 (2017) 68-87. doi:10.1016/j.desal.2016.06.033.
Ismail et al., "Effect of additive contents on the performances and structural properties of asymmetric polyethersulfone (PES) nanofiltration membranes," Sep. Purif. Technol. 55 (2007) 98-109. doi:10.1016/j.seppur.2006.11.002.
Kaner et al., "Zwitterion-containing polymer additives for fouling resistant ultrafiltration membranes". Journal of Membrane Science. Jul. 1, 2017; 533:141-59.
Kumar et al., "Novel ultrafiltration membranes with adjustable charge density based on sulfonated poly(arylene ether sulfone) block copolymers and their tunable protein separation performance," Polym. (United Kingdom). 55 (2014) 354-365. doi:10.1016/j.polymer.2013.09.003.
Lee et al., "Disulfonated poly(arylene ether sulfone) random copolymer thin film composite membrane fabricated using a benign solvent for reverse osmosis applications," J. Memb. Sci. 389 (2012) 363-371. doi:10.1016/j.memsci.2011.11.001.
Lee et al., "A review of reverse osmosis membrane materials for desalination—Development to date and future potential," J. Memb. Sci. 370 (2011) 1-22. doi:10.1016/j.memsci.2010.12.036.
Li et al., "Improved surface property of PVDF membrane with amphiphilic zwitterionic copolymer as membrane additive," Appl. Surf. Sci. 258 (2012) 6398-6405. doi:10.1016/j.apsusc.2012.03.049.
Li et al., "Making polymeric membranes antifouling via 'grafting from' polymerization of zwitterions," J. Appl. Polym. Sci. 132 (2015). doi:10.1002/app.41781.
Lind et al. "Effect of mobile cation on zeolite-polyamide thin film nanocomposite membranes," J. Mater. Res. 24 (2009) 1624-1631. doi:10.1557/jmr.2009.0189.
Liu et al., "Antifouling Thin-Film Composite Membranes by Controlled Architecture of Zwitterionic Polymer Brush Layer", Environ. Sci. Technol. 51 (2017) 2161-2169. doi:10.1021/acs.est.6b05992.
Liu et al., "Influence of imidazolium-based ionic liquids on the performance of ionic polymer conductor network composite actuators," Polym. Int. 59 (2010) 321-328. doi:10.1002/pi.2771.
Lu et al., "Novel soluble and fluorescent poly(arylene ether)s containing p-quaterphenyl, 2,5-bis (4-phenylphenyl)oxadiazole, or 2,5-bis(4-phenylphenyl)triazole groups," Macromolecules. 34 (2001) 5860-5867.doi:10.1021/ma0103977.
Ma et al., "High-flux and fouling-resistant reverse osmosis membrane prepared with incorporating zwitterionic amine monomers via interfacial polymerization", Desalination. 381 (2016) 100-110. doi:10.1016/j.desal.2015.11.023.
Mahajan et al. "Mixed matrix membrane materials with glassy polymers". Part 1, Polym. Eng. Sci. 42 (2002) 1420-1431. doi:10.1002/pen.11041.
McCutcheon et al., "Influence of membrane support layer hydrophobicity on water flux in osmotically driven membrane processes," J. Memb. Sci. 318 (2008) 458-466. doi:10.1016/j.memsci.2008.03.021.
McKee et al. "Solution Rheological Behavior and Electrospinning of Cationic Polyelectrolytes," Macromolecules 2006 39(2), pp. 575-583, Nov. 21, 2005.
Misdan et al., "Seawater Reverse Osmosis (SWRO) desalination by thin-film composite membrane—current development," challenges and future prospects, Desalination. 287 (2012) 228-237. doi:10.1016/j.desal.2011.11.001.
Pang et al. (Applied Surface Science 427 (2018) 1065-1075).
Park et al., "Highly chlorine-tolerant polymers for desalination," Angew. Chemie—Int. Ed. 47 (2008) 6019-6024. doi:10.1002/anie.200800454.
Park et al., "Dual-mode fluorescence switching induced by self-assembly of well-defined poly(arylene ether sulfone)s containing pyrene and amide moieties," Chem. Commun. 48 (2012) 10556. doi:10.1039/c2cc35804b.
Paul et al., "Synthesis and crosslinking of partially disulfonated poly(arylene ether sulfone) random copolymers as candidates for chlorine resistant reverse osmosis membranes", Polymer (Guildf). 49 (2008) 2243-2252. doi:10.1016/j.polymer.2008.02.039.
Quinn et al., "Preparation and characterization of crosslinked electrospun poly(vinyl alcohol) nanofibrous membranes," Polymer, 134, (2018), pp. 275-281.
Ren et al., "Sulfonated polysulfone supported high performance thin film composite membranes for forward osmosis," Polym. (United Kingdom). 103 (2016) 486-497. doi:10.1016/j.polymer.2016.02.058.
Sae-Ung et al., "Antifouling Stripes Prepared from Clickable Zwitterionic Copolymers," Langmuir. 33 (2017) 7028-7035. doi:10.1021/acs.langmuir.7b01431.
Schreiner et al., "Segmented imidazolium ionenes: Solution rheology, thermomechanical properties, and electrospinning," Polym. (United Kingdom). 114 (2017) 257-265. doi:10.1016/j.polymer.2017.03.003.
Shaikh et al., "Synthesis and characterization of soluble, fluorescent poly(arylene ether)s, poly(arylene thioether)s, and poly(arylene sulfone)s containing 1,3,5-triphenylbenzene segments," J. Polym. Sci. Part A Polym. Chem. 40 (2002) 496-510. doi:10.1002/pola.10136.
Surawanvijit et al., "An Integrated approach for characterization of polyamide reverse osmosis membrane degradation due to exposure to free chlorine," J. Memb. Sci. 510 (2016) 164-173. doi:10.1016/j.memsci.2016.02.044.
Tang, et al. Polysulfone membranes modified with bioinspired polydopamine and silver nanoparticles formed in situ to mitigate biofouling, Environ. Sci. Technol. Lett. 2 (2015) 59-65. doi:10.1021/acs.estlett.5b00008.
Verbeke et al., "Chlorine-resistance of reverse osmosis (RO) polyamide membranes," Prog. Polym. Sci. 72 (2017) 1-15. doi:10.1016/j.progpolymsci.2017.05.003.

(56) References Cited

OTHER PUBLICATIONS

Wang et al., "Highly efficient antifouling ultrafiltration membranes incorporating zwitterionic poly([3-(methacryloylamino)propyl]-dimethyl(3-sulfopropyl) ammonium hydroxide)," Journal of Membrane Science 340 (2009) 164-170.

Wang et al. "A critical review of transport through osmotic membranes", J. Memb. Sci. 454 (2014) 516-537. doi:10.1016/j.memsci.2013.12.034.

Werber et al., "Materials for next-generation desalination and water purification membranes," Nat. Rev. Mater. 1 (2016) 16018. doi:10.1038/natrevmats.2016.18.

Xu et al., "Visible light photocatalytic thiol-ene reaction: An elegant approach for fast polymer postfunctionalization and step-growth polymerization," Macromolecules. 48 (2015) 520-529. doi:10.1021/ma502460t.

Yadav et al. "Nanocomposite silicalite-1/polydimethylsiloxane membranes for pervaporation of ethanol from dilute aqueous solutions", Ind. Eng. Chem. Res. 52 (2013) 5207-5212. doi:10.1021/ie303240f.

Yang et al., "Zwitterionic poly(arylene ether sulfone) copolymer/poly(arylene ether sulfone) blends for fouling-resistant desalination membranes," Journal of Membrane Science vol. 561, Sep. 1, 2018, pp. 69-78.

Yang et al., "Surface hydrophilization of microporous polypropylene membrane by grafting zwitterionic polymer for anti-biofouling," J. Memb. Sci. 362 (2010) 255-264. doi:10.1016/j.memsci.2010.06.048.

Yang et al., "Surface-tethered zwitterionic ultrathin antifouling coatings on reverse osmosis membranes by initiated chemical vapor deposition," Chem. Mater. 23 (2011) 1263-1272. doi:10.1021/cm1031392.

Ye et al., "Controlled Architecture of Dual-Functional Block Copolymer Brushes on Thin-Film Composite Membranes for Integrated "defending" and "attacking" Strategies against Biofouling," ACS Appl. Mater. Interfaces. 7 (2015) 23069-23079. doi:10.1021/acsami.5b06647.

Yi et al., "Polysulfone-based amphiphilic polymer for hydrophilicity and fouling resistant modification of polyethersulfone membranes," J. Memb. Sci. 365 (2010) 25-33. doi:10.1016/j.memsci.2010.08.001.

Yin et al. "Polymer-matrix nanocomposite membranes for water treatment," J. Memb. Sci. 479 (2015) 256-275. doi:10.1016/j.memsci.2014.11.019.

Yip et al. "High Performance Thin-Film Membrane", 44 (2010) 3812-3818.

Yue et al., "Grafting of zwitterion from polysulfone membrane via surface-initiated ATRP with enhanced antifouling property and biocompatibility," J. Memb. Sci. 446 (2013) 79-91. doi:10.1016/j.memsci.2013.06.029.

Zhang et al., Novel zwitterionic poly(arylene ether sulfone)s as antifouling membrane material, J. Memb. Sci. 349 (2010) 217-224. doi:10.1016/j.memsci.2009.11.048.

Zhao et al., "Modification of polyethersulfone membranes—A review of methods," Prog. Mater. Sci. 58 (2013) 76 -150. doi:10.1016/j.pmatsci.2012.07.002.

Zhao et al., "Electrolyte-responsive polyethersulfone membranes with zwitterionic polyethersulfone-based copolymers as additive," J. Memb. Sci. 510 (2016) 306-313. doi:10.1016/j.memsci.2016.03.006.

Zodrow et al. "Polysulfone ultrafiltration membranes impregnated with silver nanoparticles show improved biofouling resistance and virus removal," Water Res. 43 (2009) 715-723. doi:10.1016/j.watres.2008.11.014.

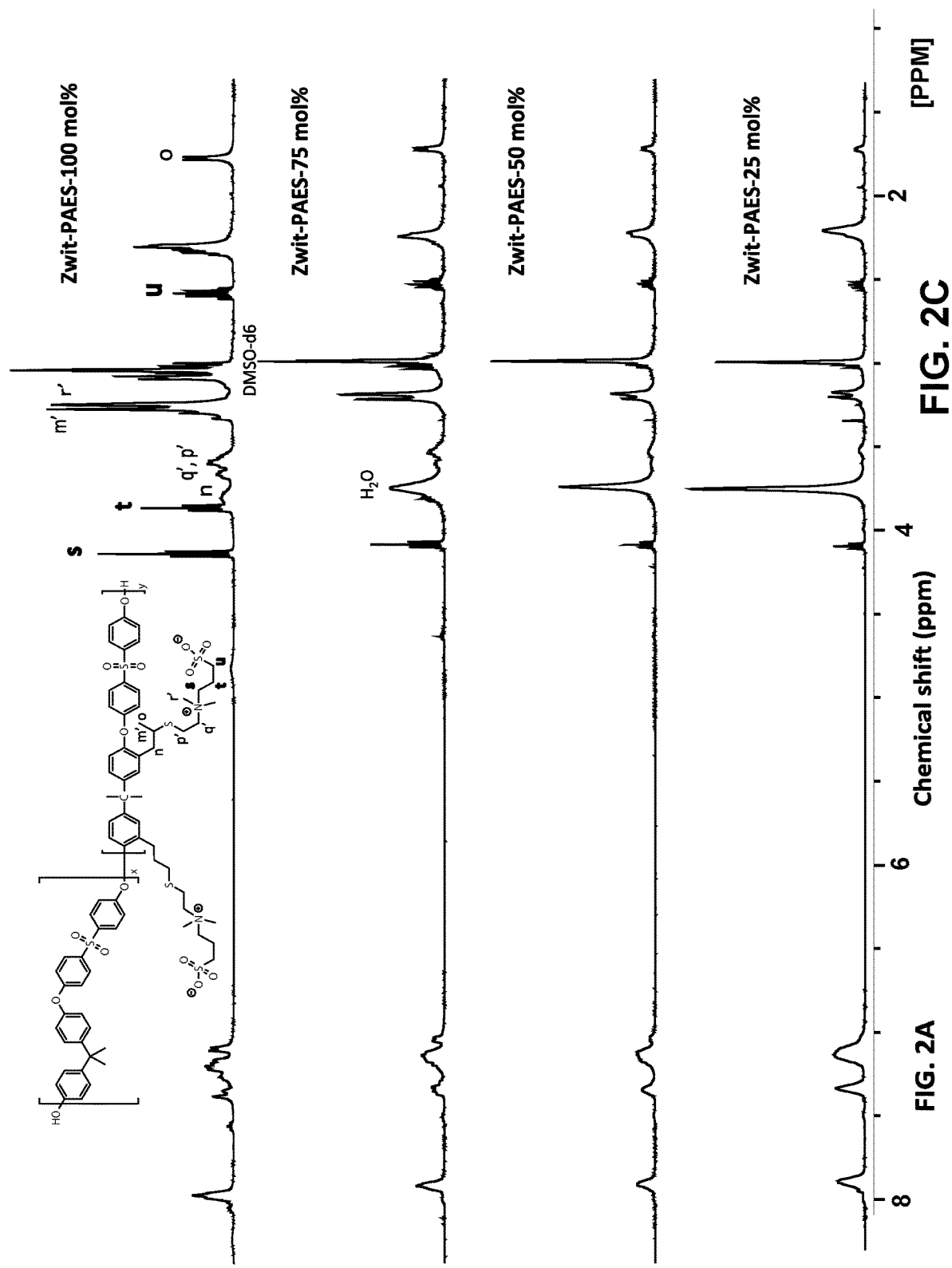

ZWITTERIONIC POLY(SULFOBETAINE ARYLENE ETHER SULFONE) POLYMER SYNTHESIS ROUTE AND APPLICATIONS FOR DESALINATION MEMBRANES

CROSS-REFERENCE TO RELATED APPLICATIONS

This application is a continuation of U.S. application Ser. No. 16/374,501 filed on Apr. 3, 2019, which claims the benefit of U.S. Application No. 62/652,209 filed on Apr. 3, 2018, which are incorporated by reference herein in their entirety.

STATEMENT OF GOVERNMENT INTEREST

This invention was made with government support under 1836719 awarded by the National Science Foundation and 80NSSC18K1508 awarded by NASA. The government has certain rights in the invention.

TECHNICAL FIELD

This invention relates to synthesis of zwitterionic polysulfone polymers, including poly(sulfobetaine arylene ether sulfone) polymers, and desalination membranes including zwitterionic polysulfone polymers.

BACKGROUND

Polysulfobetaines, in which both the sulfonate anion and the ammonium cation are covalently attached to the same repeat unit, have been used to prepare zwitterionic polyelectrolytes that improve the anti-fouling properties of water purification membranes. Some zwitterionic thin-film composite (TFC) desalination membranes have been designed with various approaches, such as interfacial polymerizations, surface grafting, and initiated chemical vapor deposition (iCVD). However, there are pitfalls for these approaches, such as 1) high sensitivity of polyamide (PA)-based or poly(sulfobetaine methacrylate) (PSBMA)-based selective layers to chlorine-driven oxidative degradation, and 2) specialized devices and complicated pre-treatment steps, which make it hard to scale up due to increased fabrication costs and energy consumption.

SUMMARY

Fouling resistant polysulfone-based desalination membranes incorporating zwitterionic poly(sulfobetaine arylene ether sulfone) (SBAES) polymers into polysulfone (PSf) are fabricated by a non-solvent induced phase separation (NIPS) process. In some implementations, the SBAES polymers include poly(arylene ether sulfone)-co-sulfobetaine arylene ether sulfone) (PAES-co-SBAES) copolymers. The SBAES segments provide improved membrane surface hydrophilicity, increased porosity in support layer, and a mechanically strong matrix that allows the preparation of free-standing membranes. The water permeance and fouling resistance properties of the PSf/SBAES blend membranes are superior compared to the unmodified PSf (~25× increase in water permeance and 93% flux recovery). Salt rejection of the membranes can be maintained at a high level (97%). The membranes are resistant towards oxidative degradation caused by exposure to chlorine (8,000 ppm h), and are suitable for nano- and microfiltration, potentially brackish water or seawater desalination, and hydrophilic membrane supports.

In a first general aspect, a zwitterionic polysulfone is formed from an allyl-containing monomer, a phenol-containing monomer, and an aryl-halide-containing monomer.

In a second general aspect, a polysulfone is represented by the formula:

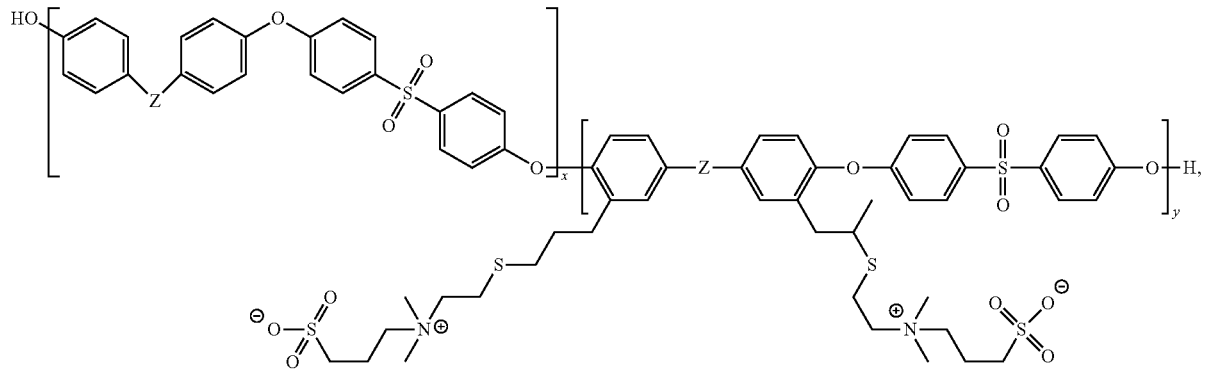

where each Z independently represents a single bond, a substituted carbon atom (e.g., —CH$_2$—, —CHCH$_3$—, and —C(CH$_3$)$_2$—), or —SO$_2$—, and x and y represent mole percent of the arylene ether sulfone component and the sulfobetaine arylene ether sulfone component, respectively, and x+y=100.

Implementations of the second general aspect may include one or more of the following features.

In the polysulfone of the second general aspect, 0<y≤100, 25≤y≤100, 0≤y≤25, or 25≤y≤75. The molar mass of the polysulfone is typically in a range of about 5 kDa–35 kDa (Mn) or about 10 kDa to about 65 kDa (Mw). In some cases, the molar mass (Mn) of the polysulfone is in a range of about 5 kDa to about 15 kDa or a range of about 15 kDa to about 35 kDa.

The polysulfone typically includes about 2 wt % to about 20 wt % or about 2 wt % to about 10 wt % of the zwitterionic component.

In a third general aspect, synthesizing a polysulfone includes reacting 2,2'-diallylbisphenol A (DABA) with a 4,4'-dihalophenyl sulfone (DXDPS) to yield a poly(arylene ether sulfone) with pendant allyl groups.

Implementations of the third general aspect may include one or more of the following features.

Reacting the DABA with the DXPS occurs in the presence of combining an allyl-containing monomer in the presence of potassium carbonate, toluene, and N,N-dimethylacetamide or dimethyl sulfoxide. DXDPS may include 4,4'-dichlorophenyl sulfone, 4,4'-difluorophenyl sulfone, or a combination thereof.

Implementations of the third general aspect may include one or more of the following: reacting the poly(arylene ether sulfone) polysulfone with 2,2-dimethoxy-2-phenylacetophenone, 2-dimethylamino ethanethiol, and 1,3-propane sultone to yield a poly(sulfobetaine arylene ether sulfone) polymer; combining bisphenol A (BPA) with the DABA and the DXPS to yield a poly(arylene ether sulfone) copolymer with pendant allyl groups; and reacting the poly(arylene ether sulfone) copolymer with 2,2-dimethoxy-2-phenylacetophenone, 2-dimethylamino ethanethiol, and 1,3-propane sultone to yield a poly(arylene ether sulfone-co-sulfobetaine arylene ether sulfone) copolymer. A molar ratio of DABA to BPA is in a range of about 1:99 to about 99:1.

In a fourth general aspect, a composition includes a polysulfone and a poly(arylene ether sulfone-co-sulfobetaine arylene ether sulfone) copolymer.

Implementations of the fourth general aspect may include one or more of the following features.

The composition may include about 2 wt % to about 6 wt % of the sulfobetaine arylene ether sulfone component, where the poly(arylene ether sulfone-co-sulfobetaine arylene ether sulfone) copolymer includes an arylene ether sulfone component and a sulfobetaine arylene ether sulfone component. The poly(arylene ether sulfone-co-sulfobetaine arylene ether sulfone) copolymer may include about 10 wt % of the sulfobetaine arylene ether sulfone component.

A fifth general aspect includes a membrane formed from the composition of the fourth general aspect.

In a sixth general aspect, a polysulfone includes an arylene ether sulfone component having pendant allyl groups, wherein the arylene ether sulfone component is formed by reacting: a first component including a diphenyl sulfone, a second component including a biphenol or bisphenol having the pendant allyl groups, and a third component including a biphenol or bisphenol.

Implementations of the sixth general aspect may include one or more of the following features.

The polysulfone can be zwitterionic. Suitable examples of the diphenyl sulfone include DFDPS, DCDPS, and other appropriate compounds. Suitable examples of the biphenol or bisphenol having pendant allyl groups include DABA and other appropriate compounds. Suitable examples of the biphenol or bisphenol include BPA, bisphenol F, bisphenol S, 4,4'-biphenol, 2,2'-biphenol, and appropriate compounds. Other suitable examples include hydroquinone.

The details of one or more implementations of the subject matter of this disclosure are set forth in the accompanying drawings and the description. Other features, aspects, and advantages of the subject matter will become apparent from the description, the drawings, and the claims.

BRIEF DESCRIPTION OF THE DRAWINGS

FIGS. 2A-2C show $^1$H-NMR spectra of poly(arylene ether sulfone) (PAES) and allyl-modified poly(arylene ether sulfone) (A-PAES) polymers, tertiary amine-modified PAES (TA-PAES) polymers, and zwitterionic SBAES polymers, respectively. Spectra in FIG. 2C indicate successful polymerization of SBAES with SBAES content from 25 mol % to 100 mol %.

DETAILED DESCRIPTION

Polymers containing a relatively hydrophobic poly(arylene ether sulfone) (PAES) backbone and hydrophilic sulfobetaine side chains were synthesized by step growth polymerization and post-polymerization modifications. The PAES backbone structure has a high glass transition temperature, which is significantly above room temperature (>200° C. for high molar mass), strong mechanical properties, and chlorine resistance. Sulfobetaine imparts hydrophilicity and anti-fouling performance. Additionally, free-standing membranes obtained (due to the $T_g$ and modulus of PAES-based polymers) are compatible and miscible with a PSf matrix and allow preparation of blended membranes with tunable charge content. In one example, allyl-modified PAES (A-PAES) copolymer was prepared by introducing bisphenol A (BPA) and 4,4'-dichlorodiphenyl sulfone (DCDPS) in the presence of potassium carbonate in toluene/N,N-dimethylacetamide (DMAc), as well as an allyl-containing monomer, 2,2'-diallylbisphenol A (DABA). In this way, the PAES copolymers with pendant allyl groups can be functionalized after the polymerization (i.e., with zwitterions) and the concentration of allyl functionality can be tailored by varying the monomer ratio of DABA/BPA. In one implementation, the polymers are synthesized via step-growth polymerization at temperatures below the standard conditions for PSf synthesis in order to reduce the isomerization of allyl groups and other side-reactions (e.g., regioisomers can form on the PAES copolymer).

Figure 1:
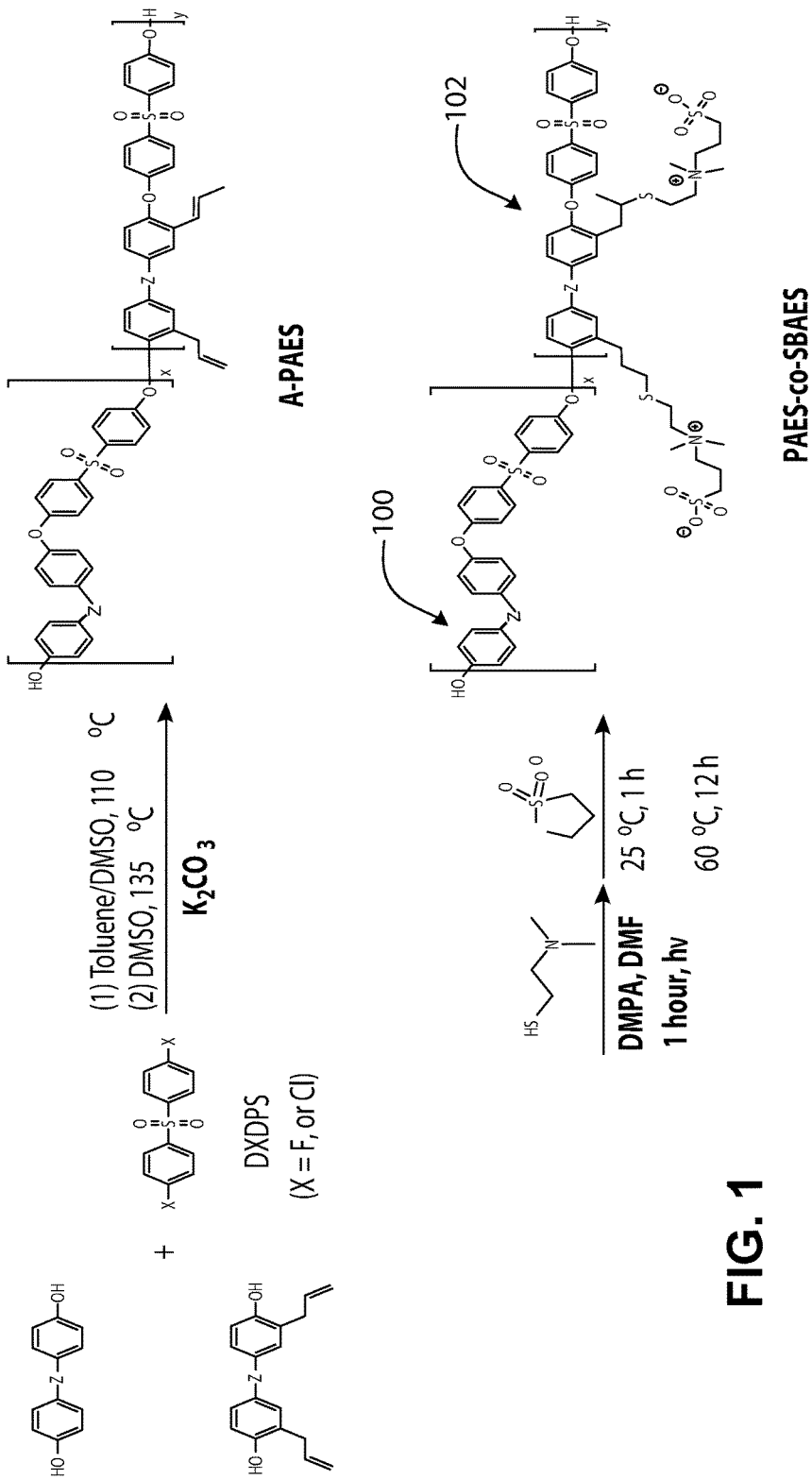
FIG. 1 depicts synthesis of zwitterionic poly(sulfobetaine arylene ether sulfone) (SBAES) polymers.

The process depicted in FIG. 1 can be used to synthesize linear SBAES polymers (e.g., homopolymers and copolymers) by a thiol-ene click reaction. In some implementations, a process similar to that depicted in FIG. 1 is used to form a zwitterionic polysulfone from an allyl-containing monomer, a phenol-, biphenol-, or bisphenol-containing monomer, and an aryl-halide-containing monomer. The zwitterionic polysulfone can include an arylene ether sulfone component having pendant allyl groups. The arylene ether sulfone component can be formed by reacting a first component including a diphenyl sulfone, and a second component including a biphenol or bisphenol comprising the pendant allyl groups.

In some implementations, polysulfones described herein include an arylene ether sulfone component having pendant allyl groups, wherein the arylene ether sulfone component is formed by reacting: a first component including a diphenyl sulfone, a second component including a biphenol or bisphenol having the pendant allyl groups, and a third component including a biphenol or bisphenol. Suitable examples of the diphenyl sulfone include DFDPS, DCDPS, and other appropriate compounds. Suitable examples of the biphenol or bisphenol having pendant allyl groups include DABA and other appropriate compounds. Suitable examples of the biphenol or bisphenol include BPA, bisphenol F, bisphenol S, and 4,4'-biphenol. 2,2'-biphenol, hydroquinone, and other appropriate compounds may also be used, with the corresponding structural change in the resulting structural formula. Compounds such as As used herein, PAES-co-SBAES, as depicted in FIG. 1, includes SBAES homopolymers and random copolymers. In FIG. 1, each Z independently represents a single bond, a substituted or unsubstituted carbon atom (e.g., —$CH_2$—, —$CHCH_3$—, —$C(CH_3)_2$—), or —$SO_2$—, and x and y represent mol % of the arylene ether sulfone component 100 and the sulfobetaine arylene ether sulfone component 102, and 0<y≤100) such that, when y=100, PAES-co-SBAES is a SBAES homopolymer. When y<100, PAES-co-SBAES is a copolymer with a non-zero amount of SBAES less than 100 mol %. The molecular weight (Mw) of PAES-co-SBAES can be in a range of 8.7 kDa to 65 kDa of Mw. As depicted in FIG. 1, PAES-co-SBAES is synthesized by introducing a bisphenol, a biphenol, or any combination thereof, and 4,4'-dihalodiphenyl sulfone (DFDPS) in the presence of potassium carbonate in toluene/dimethyl sulfoxide (DMSO), as well as a bisphenol with pendant allyl groups, a biphenol with pendant allyl groups, or any combination thereof, to yield A-PAES. The dihalodiphenyl sulfone may include difluorodiphenyl sulfone, dichlorodiphenyl sulfone, or a combination thereof. After polymerization, A-PAES is reacted with dimethylformamide (DMF) and 1,3-propane sultone in the presence of 2,2-dimethoxy-2-phenylacetophenone (DMPA) to yield PAES-co-SBAES. The molar ratio of bisphenol, biphenol, or the combination thereof, to the bisphenol with pendand allyl groups, biphenol with pendant allyl groups, or combination there (e.g., DABA), can be selected to yield the desired mol % of SBAES, which can range from >0 mol % to 100 mol %.

Figure 2A:
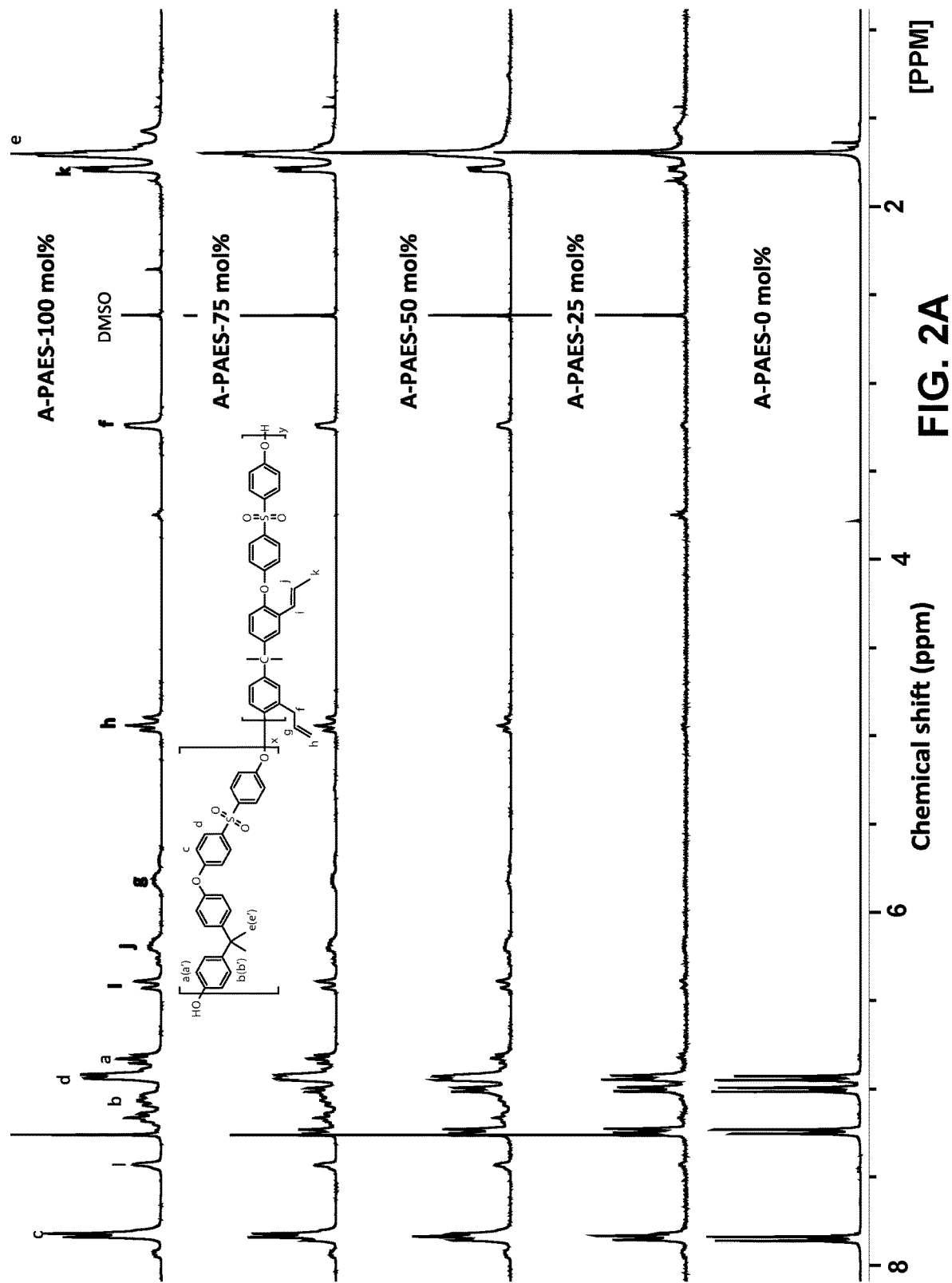
Figure 2B:
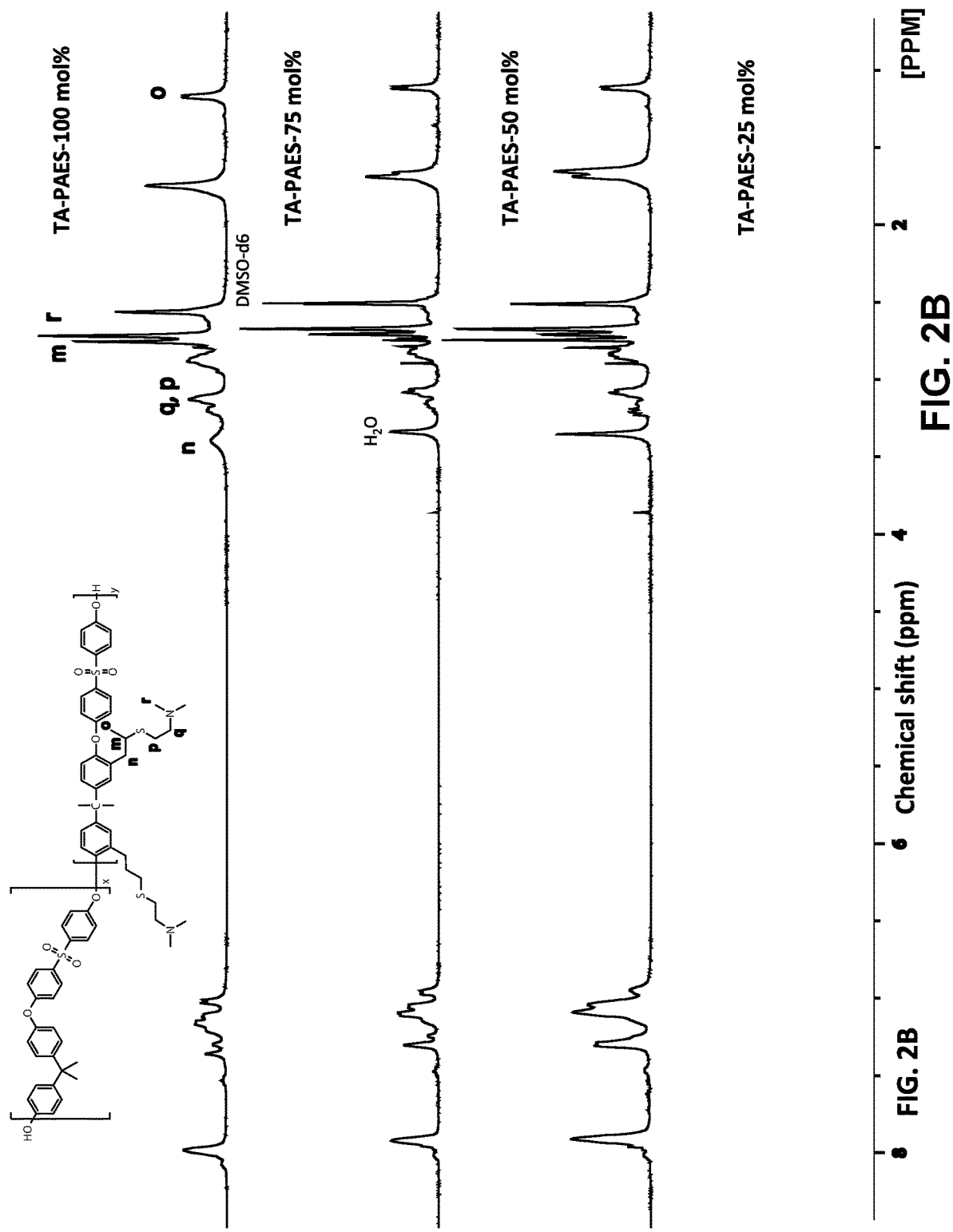

FIGS. 2A-2C show $^1$H-NMIR spectra of PAES and A-PAES polymers, tertiary amine-modified PAES (TA-PAES) polymers, and zwitterionic SBAES polymers, respectively. In FIGS. 2A-2C, x and y represent molar fraction of the corresponding units, and a-k represent the labeled proton with corresponding chemical shift peak labeled on the $^1$H-NMIR spectra. From the analysis of $^1$H-NMR spectra shown in FIGS. 2A-2C, the ratio of DABA incorporated into the polymer matched what was fed to the reaction, indicating favorable polymerization behavior. Subsequent post-polymerization modification reactions successfully introduced tertiary amines and the ring-opened sultone yielded the zwitterion copolymer. A fraction of the allyl groups isomerized, even while performing the polymerization at a low temperature. In spite of this, the thiol-ene click reaction was successful and the tertiary amine-modified PAES (TA-PAES) copolymer was isolated. No unsaturated bonds from the allyl group or the corresponding isomer were observed following the thiol-ene click reaction. Therefore, amphiphilic PAES-co-SBAES (referred as PAES-co-SBAES, if not specified) copolymers with SBAES content from 25 mol % to 100 mol % (based on $^1$H-NMR spectroscopy) were synthesized successfully. The zwitterion functionality can provide fouling resistance, and the allyl precursor can serve as a platform to introduce a variety of functional groups through the thiol-ene reaction. The amount of allyl group and subsequent functional group can be controlled by tuning the stoichiometry (or relative amount) of DABA/BPA fed to the reaction.

Figure 3A:
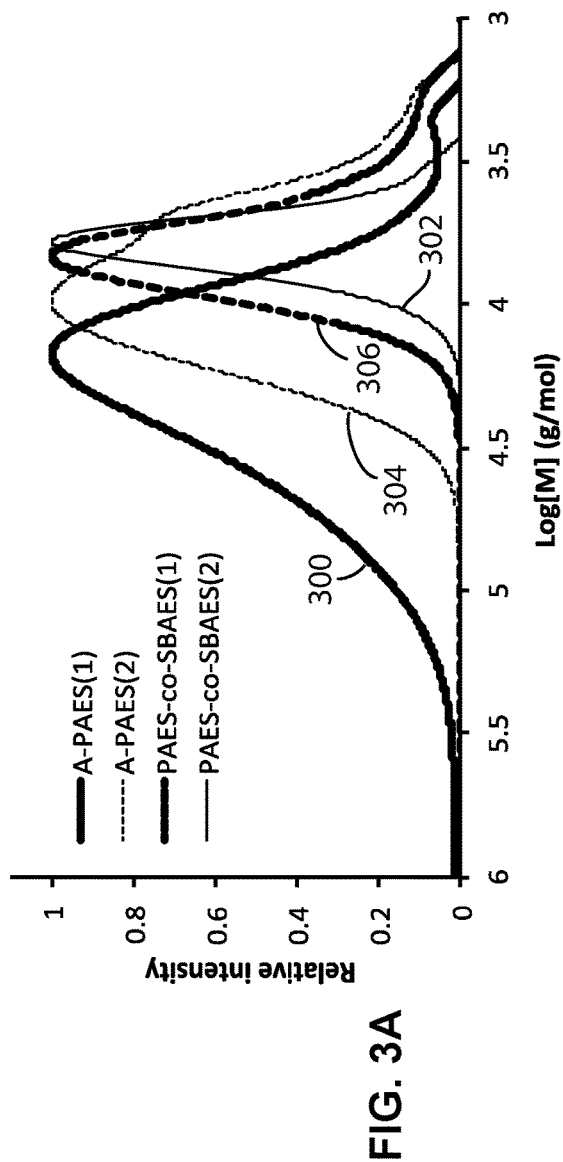
FIG. 3A shows size exclusion chromatography (SEC) traces of allyl-modified poly(arylene ether sulfone) copolymers (A-PAES(1) and A-PAES(2)), and corresponding zwitterionic PAES-co-SBAES (1) and PAES-co-SBAES (2) copolymers.
Figure 3B:
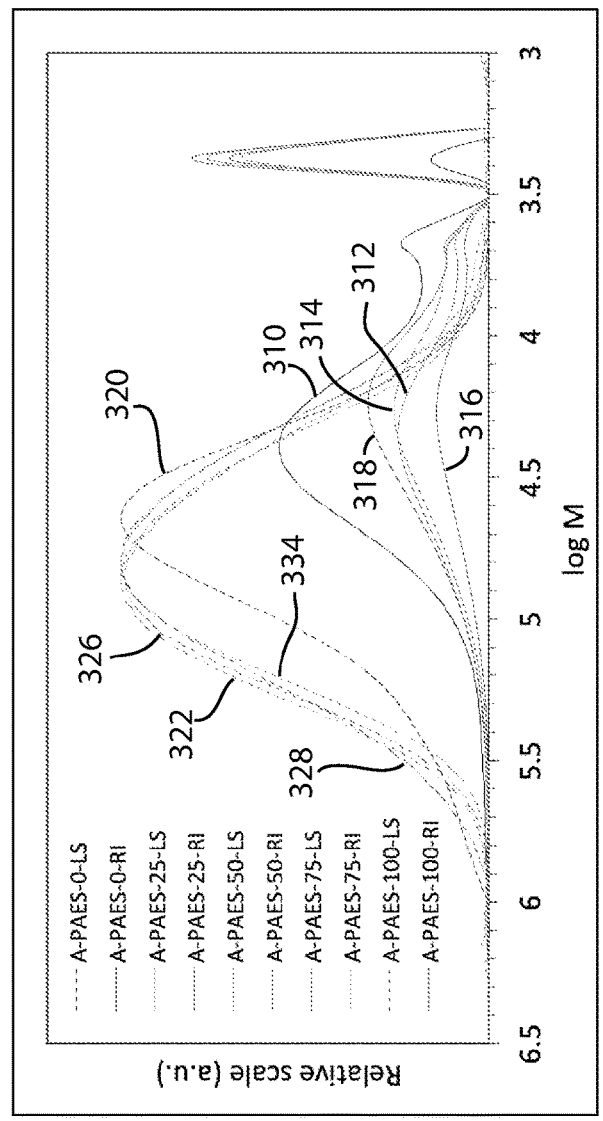
FIG. 3B shows high molar mass linear PAES and A-PAES polymers with allyl-modified segment contents of 0 mol %, 25 mol %, 50 mol %, 75 mol %, and 100 mol % (A-PAES-0, A-PAES-25, A-PAES-50, A-PAES-75, A-PAES-100, respectively).

The molar mass of allyl-modified poly(arylene ether sulfone) copolymers, and corresponding zwitterionic PAES-co-SBAES polymer series were determined with size exclusion chromatography (SEC). FIG. 3A shows size exclusion chromatography (SEC) traces of allyl-modified poly(arylene ether sulfone) copolymer A-PAES(1) 300 and A-PAES(2) 302, and corresponding zwitterionic PAES-co-SBAES (1) 304 and PAES-co-SBAES (2) 306. Table 1A shows copolymer parameters from FIG. 3A, including the molar mass of allyl-modified poly(arylene ether sulfone) copolymers polymerized with different stoichiometries for controlled allyl group content, and corresponding zwitterionic PAES-co-SBAES polymers, including number-average molar mass (Mn) determined by SEC, weight-average molar mass (Mw) determined by SEC, dispersity (Đ=Mw/Mn), Mn determined by nuclear magnetic resonance (NMR), and DABA:BPA:DCDPS. FIG. 3B shows high molar mass linear A-PAES copolymers with allyl-modified segment content of 0 mol %, 25 mol %, 50 mol %, 75 mol %, and 100 mol % (i.e., A-PAES-0, A-PAES-25, A-PAES-50, A-PAES-75, A-PAES-100), as determined by refractive index (RI) (plots 310, 312, 314, 316, and 318, respectively) and light scattering (LS) (plots 320, 322, 324, 326, and 328, respectively). Table 1B shows copolymer parameters from FIG. 3B, including DABA:BPA stoichiometry, A-PAES content as determined by nuclear magnetic resonance (NMR), Mn (kDa), Mw (kDa), and dispersity (Đ).

TABLE 1A

Copolymer parameters from FIG. 3A

| Copolymer | $Mn_{SEC}$ (kDa) | $Mw_{SEC}$ (kDa) | Đ | $Mn_{NMR}$ (kDa) | DABA:BPA:DCDPS |
|---|---|---|---|---|---|
| A-PAES(1) | 15.1 | 28.2 | 1.86 | 8.9 | 5:95:100 |
| A-PAES(2) | 6.2 | 7.7 | 1.24 | 4.5 | 9:81:100 |

TABLE 1A-continued

Copolymer parameters from FIG. 3A

| Copolymer | $Mn_{SEC}$ (kDa) | $Mw_{SEC}$ (kDa) | Đ | $Mn_{NMR}$ (kDa) | DABA:BPA:DCDPS |
|---|---|---|---|---|---|
| PAES-co-SBAES(1) | 9.8 | 12.5 | 1.28 | 9.4 | 5:95:100 |
| PAES-co-SBAES(2) | 6.8 | 8.7 | 1.28 | 5.0 | 9:81:100 |

TABLE 1B

Copolymer parameters from FIG. 3B

| DABA:BPA (stoichiometry) | A-PAES content (%) | Mn (kDa) | Mw (kDa) | Đ |
|---|---|---|---|---|
| 0:100 | 0 | 34.9 | 64.7 | 1.84 |
| 25:75 | 22 | 32.9 | 62.4 | 1.90 |
| 50:50 | 45 | 33.2 | 62.5 | 1.88 |
| 75:25 | 72 | 34.3 | 63.7 | 1.86 |
| 100:0 | 100 | 33.3 | 65.0 | 1.95 |

In a polycondensation reaction between bifunctional A-A and B-B monomers where the stoichiometric ratio (r) is 1:1, the Carothers equation predicts an infinite degree of polymerization and molar mass assuming that no side-reaction occurs. Here, however, high molar mass was not achieved at a 1:1 stoichiometry. To determine the optimal non-stoichiometric ratio to achieve high molar mass polymers, therefore, a series of polycondensations of BPA and DCDPS were conducted, as well as BPA and DFDPS at various molar ratios, and the highest molar mass were observed at r=0.94~0.97. The same phenomenon, an increased Xn via stoichiometric imbalance, was observed in the polymerization with DFDPS (FIG. 1B, at 140° C. for 4 h), where the highest Mn (33 kDa) and PDI (1.93) was observed at r=0.94. In this case, an excess of DXDPS (X=Cl, or F) typically results in monomers or oligomers having two ArX end groups. A fraction of the excess —X group is believed to be hydrolyzed to a —OH group, which achieves a 1:1 stoichiometry in situ allowing for complete conversion and a high molar mass. Thus, in some cases, a ratio of 1:0.94 DXDPS: BPA may be considered optimal.

For the low molar mass (e.g., Mn about 15 kDa or less) A-PAES copolymer series (listed as A-PAES(1), and A-PAES(2) in Table 1A and FIG. 3A), substituting the zwitterionic functionality onto the polymer (listed as PAES-co-SBAES(1), and PAES-co-SBAES(2), respectively) yielded the following results. PAES-co-SBAES(1) displayed a shorter elution time than PAES-co-SBAES(2) and hence a higher molar mass. However, SEC analysis revealed that PAES-co-SBAES(1) possessed a lower molar mass than its precursor, A-PAES(1). Conversely, the shorter precursor, A-PAES(2) increased in molar mass after post-polymerization functionalization to form PAES-co-SBAES(2). Two factors may be involved here: the polymer length and the fraction of charge. For the shorter chain (A-PAES(2)), the substituted polymer contains 20 wt % SBAES groups and, thus, the charge may play a more dominant role and contribute to chain extension. However, for the longer polymer chain, the increased chain flexibility and lower charge content (10 wt %) potentially contribute to a more complicated solution conformation. For the high molar mass (e.g., Mn greater than about 15 kDa and up to about 35 kDa) A-PAES copolymer series (listed as A-PAES-0, A-PAES-25, A-PAES-50, A-PAES-75, and A-PAES-100 in Table 1B and FIG. 3B), both light scattering (LS) and refractive index (RI) results indicated a nice alignment of high molar mass (Mn=33.7±0.75 kDa, Mw=63.7±1.08 kDa) and high dispersity index (Đ=1.9±0.04) of the series of A-PAES copolymers. The combination of NMR spectroscopy and SEC data confirm that the copolymers were successfully synthesized and display typical step-growth polymerization behavior.

Blended membranes containing the PAES-co-SBAES(1) (named as PAES-co-SBAES in the following context) copolymer and pristine PSf homopolymers were prepared by a controlled phase inversion process. The two polymers were dissolved in THF, deposited on a glass plate using a doctor blade, partially evaporated in air, and then immersed in a coagulation bath containing deionized water to prepare asymmetric membranes (i.e., the non-solvent induced phase separation (NIPS) process). To study the morphology of the membranes as a function of zwitterion content in the blend polymers, images of the cross-sectional structures of the pristine PSf (M-0) and blend membranes with varying SBAES contents were taken using scanning electron microscopy (SEM). Cross-sectional SEM images of pristine PSf asymmetric membrane (0 wt % zwitterion content, or M-0) and zwitterionic blend membranes with 2 wt %, 4 wt %, and 6 wt % zwitterion (SBAES) content (M-2, M-4, M-6, respectively). M-0 shows a thick dense layer around 2 μm and randomly dispersed macro-pores underneath, while all the blend membranes display a skin-layer on the top surface with thickness around 100 nm and a sponge/finger-like porous sub-layer with thickness around 15 μm. Alternatively, dense, or pore-free, membranes can be and have been prepared by solution casting and air drying.

Analysis focused on the observed density and thickness of the selective layer (formed during solvent evaporation) and the porous support structure beneath (formed following immersion in the coagulation bath). The pristine PSf membrane M-0 displayed a thick dense layer around 2 μm and few random macro-pores under the top dense layer, which can be attributed to the instantaneous demixing that occurs in the phase inversion process. All of the blend membranes showed typical asymmetrical structures, consisting of a dense skin-layer on the top surface with a thickness around 100 nm and a porous sub-layer with a thickness around 15 μm. Sponge-like micro-porous structures were observed in all blend membranes, while the finger-like porous structures in the cross-section became more visible and both macro-pore size and micro-pore size became larger with the increasing zwitterion content in blend membranes. In addition, a noticeable decrease in the dense layer thickness above the porous support layer was observed after the incorporation of the zwitterion-functionalized copolymer. This may be attributed at least in part to 1) a reduced tetrahydrofuran (THF) vapor pressure in the polar, hydrophilic blend solutions, thus limiting the rate of evaporation when the film is exposed to a dry atmosphere, and 2) a reduced viscosity of the blend solution that expedited the solvent/non-solvent exchange during the phase inversion process. SEM images showed that the zwitterion-functionalized copolymer facilitated pore-formation during phase inversion. Blend membranes with concentration of zwitterion greater than 6 wt % were prepared. However, the resulting membranes were found to be too brittle (i.e., not free-standing) for filtration experiments. So the apparent limit of the zwitterion copolymer content in the blend membranes was around 6 wt % for the polymer used herein.

The hydrophilic poly(ethylene glycol) (PEG Mn~12,000 g/mol) was used as an additive to PSf to prepare blend membranes (M-PEG) using the procedure previously described. The addition of PEG dramatically influenced the formation of pores in the support layer due to the increased hydrophilicity and viscosity of the blend solution. Cross-sectional scanning electron micrographs of a pristine PSf membrane showed a thick dense layer around 2 μm and randomly dispersed macro-pores underneath. Cross-sectional scanning electron micrographs of a PSf/PEG blend membrane (3 wt % PEG (12,000 g/mol)M-PEG) displayed a similar asymmetric structure with a highly porous sub-layer with thickness around 5 μm. These combined effects slowed the solvent/non-solvent exchange during phase inversion, which allowed for the formation of macrovoids.

Figure 4:
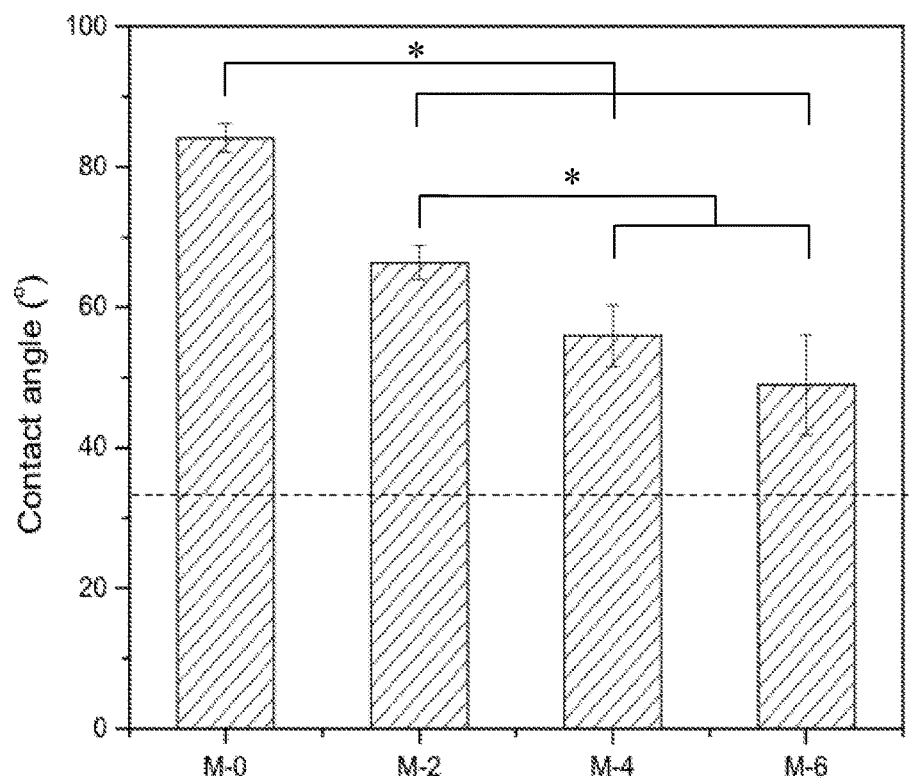
FIG. 4 shows water contact angle of membranes with different SBAES content. The dashed line indicates the water contact angle for a PAES-co-SBAES copolymer with 10 wt % sulfobetaine arylene ether sulfone segment.

Water contact angle (WCA) measurements were used to test the surface wettability and hydrophilicity of the membranes. As shown in FIG. 4, the pristine PSf membrane (M-0) showed the highest WCA (84±2°), when compared to the WCA of the blend membranes (M-2, M-4, M-6). As expected, the WCA of the blend membranes decreased gradually with the increased amount of zwitterions in the blend membranes. The wettability of the surface is understood to be dependent on factors including surface chemistry, roughness, and porosity. The dense surface layer was not observed to be porous based on the SEM images. Surface roughness (RMS) of M-0, M-2, M-4, and M-6 was measured by atomic force microscopy, and found to be 2.95±0.97, 0.41±0.04, 0.96±0.30, and 0.82±0.18, respectively. Therefore, surface composition may be the dominant factor to affect the wettability due to the initial drop in WCA from the pristine PSf membrane to that of the blend membranes. The continued decrease in WCA with added zwitterion content further substantiates the high affinity of the zwitterion functional group toward water. The lower limit of WCA for the pure PAES-co-SBAES copolymer (containing 10 wt % SBAES zwitterionic segments) was also measured as the reference dashed line shown in FIG. 4.

Figure 5:
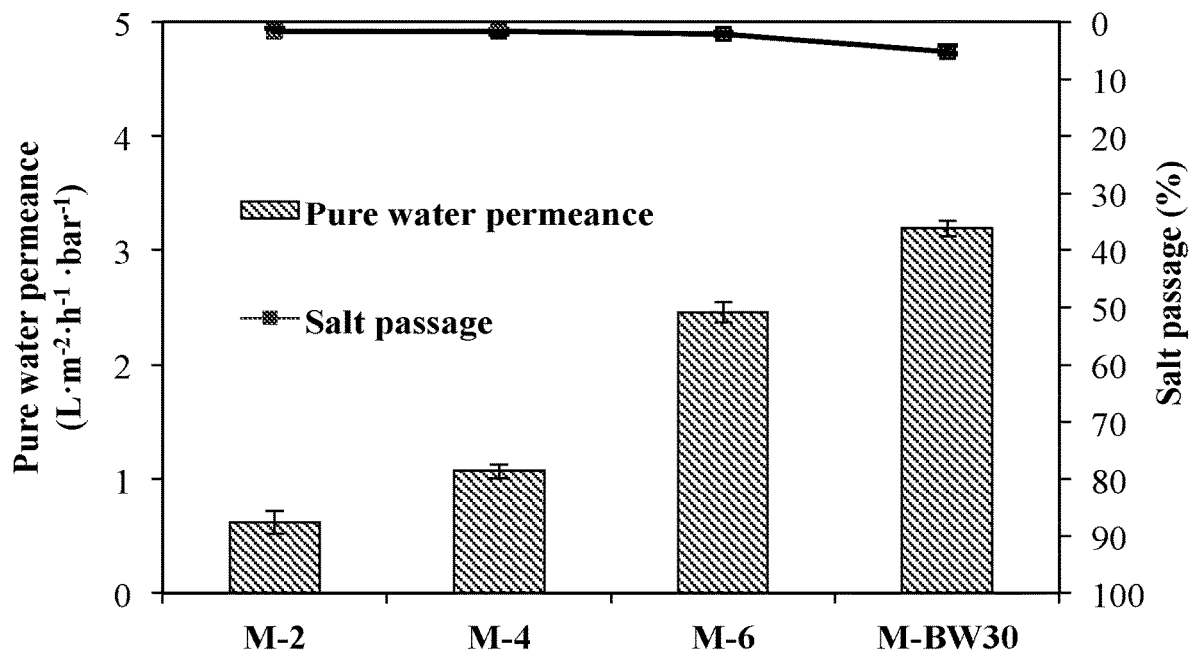
FIG. 5 shows the effect of SBAES content on desalination performance for asymmetric membranes. The membranes were challenged with 2.0 g/L NaCl aqueous solution at a transmembrane pressure drop of 8 bar and a temperature of 25° C. Data points along the top indicate salt passage (%), while the bars below indicate pure water permeance.

In order to assess the membrane transport properties, dead-end stirred cell filtration experiments were performed with pure deionized water and sodium chloride aqueous solutions. The membranes were pre-pressurized at 8 bar for 30 min before reducing to the operating transmembrane pressure of 4 bar used during the filtration experiment. FIG. 5 shows the effect of SBAES content on desalination performance for asymmetric membranes. The membranes were challenged with 1 g/L NaCl aqueous solution at a transmembrane pressure drop of 4 bar and a temperature of 25° C. Data points along the top indicated salt rejection (%), while the bars below indicated water permeance. As shown in FIG. 5, all the blend membranes showed a higher water permeance, up to 2.6 $Lm^{-2}h^{-1}bar^{-1}$, when compared to the water permeance of pristine PSf membrane, which was only 0.1 $Lm^{-2}h^{-1}bar^{-1}$. Furthermore, a gradual increase in water permeance was observed with the increased zwitterion content in the membranes (i.e., the water permeance for M-2<M-4<M-6). This finding was in agreement with the WCA measurement results discussed with respect to FIG. 4, which decreased from 84.1° to 48.9° when the zwitterion content increased from 0 wt % to 6 wt %. Thus, the improvement in the surface hydrophilicity via the addition of the zwitterionic copolymer PAES-co-SBAES may enhance the pure water permeance of the membranes. Additionally, it is believed that support morphology (i.e., porous layer beneath the dense active layer) can also influence the desalination membrane performance. From the SEM images observed, the micro-pore size slightly increased from M-2 to M-6, while the finger-like pores became more visible at the bottom of the membranes. For the highest zwitterion content investigated, M-6, the sponge-like micro-pores were almost absent due to the presence of large, long finger-like pores. These observations correspond to the increase in water permeance shown in FIG. 5. The morphology here further indicates that increased porosity of the membrane substrate layer contributes to overall membrane performance. Beyond that, the pure water permeance for native PSf membranes cast in the presence of PEG (M-PEG) was measured to be 0.14±0.04 $Lm^{-2}h^{-1}bar^{-1}$, and salt rejection was measured as 92.4%±1.4%. Compared with the filtration performance of the control membrane M-0, the M-PEG membrane showed no significant change in desalination performance due at least in part to extraction of hydrophilic PEG molecules in the coagulation bath during the NIPS process. The comparison with the M-PEG membrane may further substantiate the impact of the hydrophilic zwitterion on membrane hydrophilicity, pore formation in support layer, water permeance, and salt rejection.

As shown in FIG. 5, salt rejection was maintained at a high level (~97%), which is notable for brackish water desalination or nanofiltration applications. Thus, this blend membrane is suitable as a precursor for reverse osmosis (RO)-based purification. The salt rejection showed no change within error margins among the blend membranes as compared with the pristine PSf membrane. This indicates that the dense selective layer formed uniformly during all membrane casting processes, despite the increased hydrophilicity and water sorption caused by the increased zwitterion content in the blend membranes. The formation of the dense selective layer was also consistent with the morphologies seen in the SEM images.

The transmembrane pressure during dead-end filtration tests was 4 bar, which is lower than current lowest feed operation pressure (6.9 bar) in commercial brackish water RO purification. Also, this operating pressure is suitable, as is, for implementation into most nanofiltration applications. Although the measured permeability is below current state-of-the-art seawater RO (SWRO) or FO desalination levels, process modeling has shown that increased water permeability would result in only negligible decreases in energy consumption and capital costs. For example, it is believed that increasing the water permeability coefficient from 3 to 10 $Lm^{-2}h^{-1}bar^{-1}$ would decrease the SWRO energy requirements by less than 2%. This limited difference may be due primarily to the single-stage operation of RO, which can be understood to necessitate the use of a hydraulic pressure greater than the osmotic pressure difference between the feed and the effluent, irrespective of the membrane permeability. The use of hydraulic pressure is typically the main determinant of the energy used by the RO stage. The disclosed blend membranes, therefore, can operate at a reduced transmembrane pressure for desalination without a significant decrease in the transport performance. Additionally, the use of a blend membrane containing pristine PSf and the zwitterion-functionalized PSf dilutes the charge content, which can limit the water permeability achievable.

Figure 6:
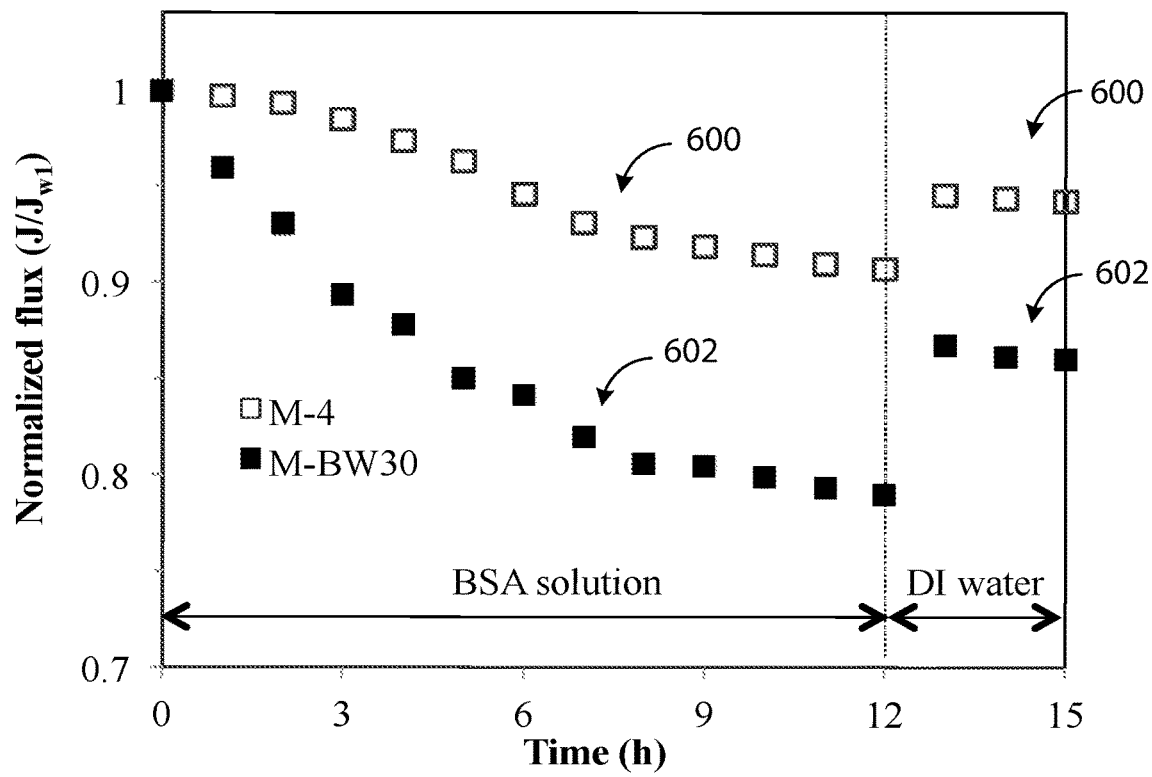
FIG. 6 shows the variation of normalized water flux of M-4 and M-BW30 tested at a hydrostatic pressure drop of 200 psi and a temperature of 25° C., challenged with a feed solution of 0.1 g/L of BSA at pH 7.0. The membranes were rinsed with deionized water for 3 h after 12 h of protein filtration, and the time was not counted in the filtration process. Pure water flux was recorded for another 3 h after the membrane rinsing.

Minimizing the adsorption of organic foulants and microorganisms to membrane surfaces can substantially reduce energy consumption and save costs during membrane-based desalination. The anti-fouling property of PSf/PAES-co-SBAES blend membranes (M-4) was tested with a solution of 0.1 g/L bovine serum albumen (BSA) in pH 4.7 ($pI_{BSA}$=4.7). FIG. 6 shows variation of normalized water flux of membrane samples M-4 600 and M-BW30 602 tested at a transmembrane pressure drop of 200 psi and a temperature of 25° C. in a cross-flow filtration system, challenged with a feed solution of 0.1 g/L of BSA at pH 7.0. The cell was rinsed with milli-Q water after 12 h of protein filtration. FIG. 6 shows that the zwitterion prevented adhesion, as shown by the high flux recovery ratio (94%) after rinsing the cell with deionized water. In comparison, the commercial brackish water RO membrane (M-BW30) displayed a flux recovery ratio of only 86% after rinsing with deionized water using the same procedure. Thus, the irreversible fouling of protein on the zwitterionic copolymer blended membrane (i.e., M-4 as of 7%) was much lower than that of the commercial polyamide membrane (i.e., M-BW30 as of 14%), which was attributed to the antifouling nature of the hydrophilic surface and the relatively low surface roughness.

Figure 7:
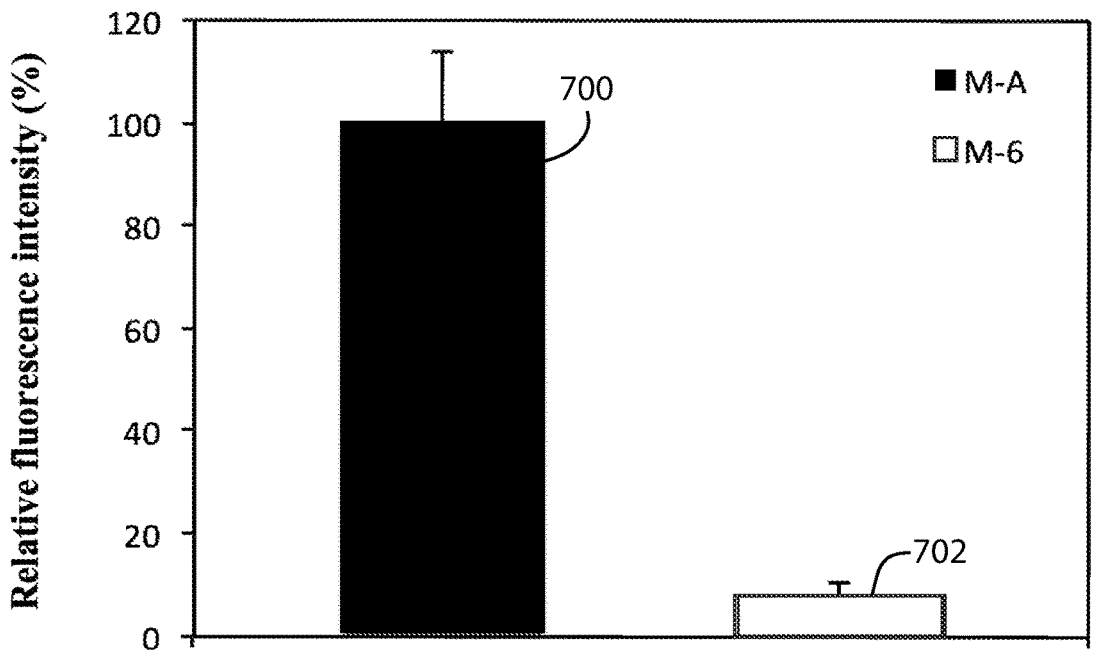
FIG. 7 shows the relative increase in fluorescence intensity for M-A (blend membrane containing PSf and A-PAES) and M-6 (blend membrane containing PSf and PAES-co-SBAES), respectively, after exposure to fluorescein-conjugated (FITC) bovine serum albumin (BSA).

The fouling resistance of the zwitterion-containing blend membrane was further investigated by exposing both an allyl-containing PAES/PSf blend membrane (M-A) and a zwitterionic PSBAES/PSf blend membrane (M-6) to a solution of fluorescein-conjugated (FITC) bovine serum albumin (BSA) (0.05 mg/mL) in phosphate-buffer saline (PBS) at pH 7.4 for 3 h in the dark. The two blend membranes contained the same weight percent concentration of native PSf. The change in fluorescence intensity between the membranes exposed to PBS alone versus the FITC-BSA solutions is attributed to the adsorption of the fluorescent FITC-BSA onto the membranes. The intensity of fluorescence was quantitatively measured using ImageJ software. The M-A before exposure to FITC-BSA displayed a low fluorescence intensity commonly observed for poly(arylene ether sulfone) backbones, while a highly increased fluorescence intensity was observed after exposure to the FITC-BSA solution. Conversely, the SBAES-containing blend membrane (M-6) showed a very small fluorescence intensity change, thus very little adsorption of BSA was observed. This observation, summarized in FIG. 7 as the relative change in fluorescence intensity for M-A 700 and M-6 702, further demonstrates the strong hydration capability of the zwitterionic copolymers and their ability to effectively prevent the adhesion of BSA.

Figure 8A:
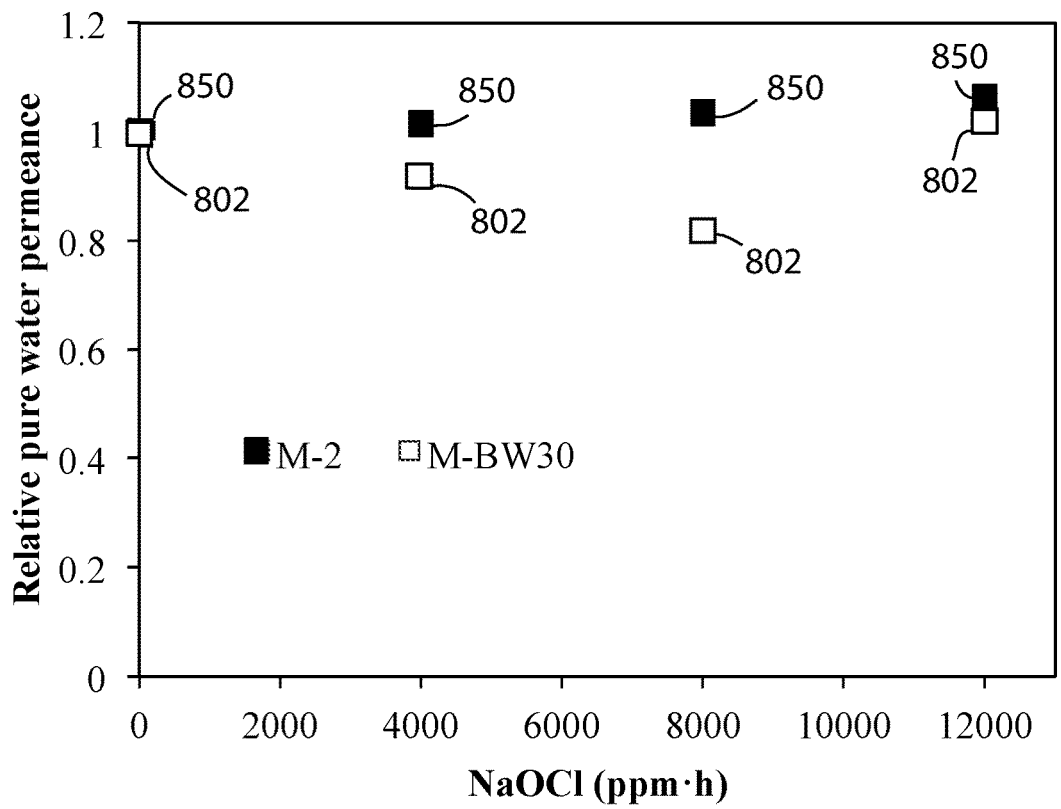
FIGS. 8A and 8B show water permeance and salt rejection, respectively, for M-2 (native PSf blended with PAES-co-PSBAES) with 2 wt % zwitterion content in the blended membrane and commercial TFC membrane BW30.
Figure 8B:
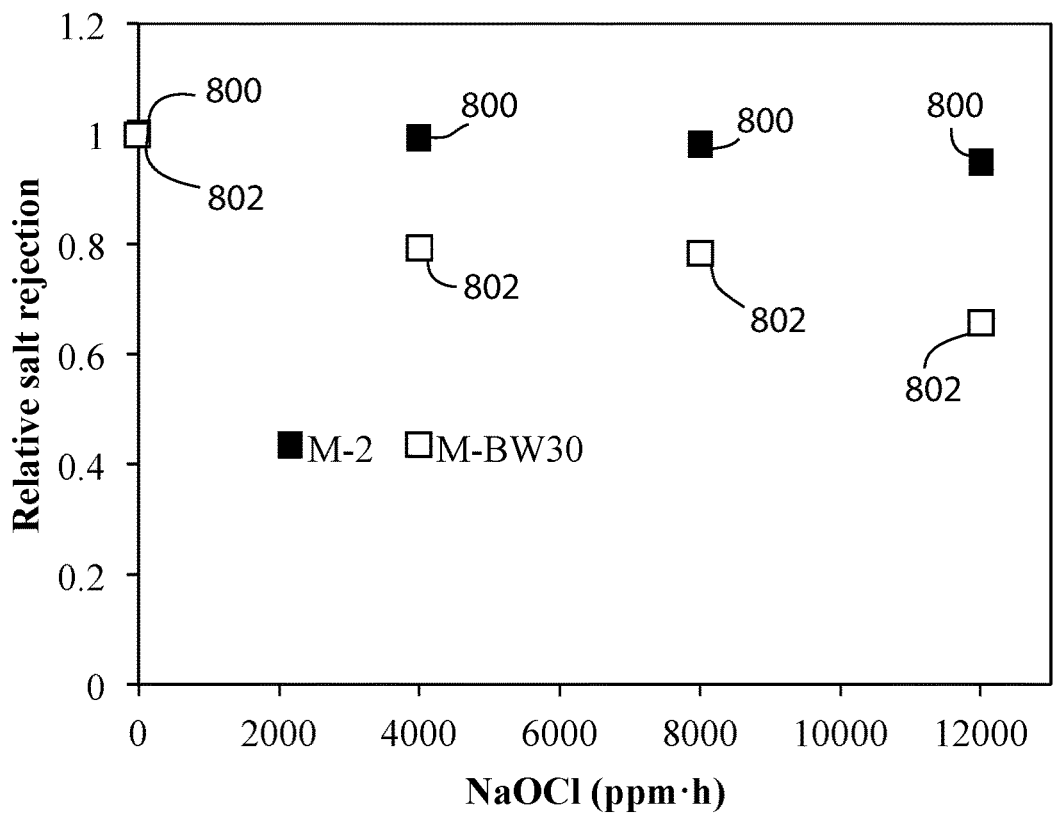

To confirm the advantage of polysulfone based blend membranes, chlorine resistance at a pH of 7.1 of the M-2 for 3 h. Plots 800 and 802 in FIGS. 8A and 8B correspond to M-2 and M-BW30, respectively. As shown in FIG. 8A, the pure water permeance was maintained as 0.74 ±0.12 $Lm^{-2}h^{-1}bar^{-1}$ both before and after exposure to chlorine. Additionally, the salt rejection was measured to be 94.5±3.1% before chlorine exposure and 95.7±0.1% after chlorine exposure (FIG. 8B), which was not a statistically significant change. No loss in water permeance or salt rejection was observed, demonstrating the chlorine resistance of this membrane. Further enhancements to the polymer molar mass will enable higher zwitterion weight fractions, which will further increase the hydrophilicity and potentially the water permeance and fouling resistance.

EXAMPLE SYNTHESIS 2,2'-Diallylbisphenol A (DABA, 85%) was purchased from Sigma-Aldrich and distilled from tetrahydrofuran (THF) under vacuum before use. 4,4'-Dichlorodiphenyl sulfone (DCDPS, 98%) and 4,4'-difluorodiphenyl sulfone (DFDPS, 98%) were purchased from Sigma-Aldrich and recrystallized from diethyl ether before use. THF and toluene (99.8%) were purchased from Sigma-Aldrich and used after passing through M. Braun SPS-800 solvent purification system. Bisphenol A (BPA, ≥99%), 18-Crown-6 (99%), N,N-dimethylacetamide (DMAc, 99.5%), N,N-dimethylformamide (DMF, ≥99.8%), potassium carbonate ($K_2CO_3$, ≥99%), 1,3-propane sultone (1,3-PS), polysulfone (16,000 Da by MO), bovine serum albumin (BSA, ≥98%), deuterated chloroform ($CDCl_3$, 99.8 atom % D, 0.03% (v/v) TMS), 2-(dimethylamino) ethanethiol, 2,2-dimethoxy-2-phenylacetophenone (DMPA, 99%) were all purchased from Sigma-Aldrich and used as received. Chloroform (99.8%) and hydrochloric acid (HCl, 36.5-38%) were purchased from BDH® VMR analytical and used as received. Fluorescein-conjugated BSA (FITC-BSA, Life Technologies, A23015) and phosphate-buffer saline (PBS) were provided by a non-commercial source.

The low molar mass linear A-PAES were synthesized via the traditional polycondensation reaction. One example case is provided as in DCDPS/BPA/DABA system. BPA (7.54 g, 33.06 mmol), DABA (0.53 g, 1.74 mmol), DCDPS (10 g, 34.8 mmol), $K_2CO_3$ (4.8 g, 34.8 mmol), and 18-crown-6 (0.1 g) were added to a three-neck, 250-mL flask equipped with a condenser, Dean Stark trap, nitrogen inlet/outlet, and a mechanical stirrer. DMAc (95 mL) and toluene (46 mL) were added to the flask to dissolve the monomers. The solution was heated under reflux at 110° C. for 4 h while the toluene-water azeotrope was removed from the reaction mixture, and then the toluene was completely removed by slowly increasing the temperature to 130° C. The reaction was continued for 36 h at 130° C. The reaction mixture was cooled to room temperature and diluted with 200 mL of chloroform. It was filtered to remove the salt, then stirred with excess 36.5%-38% HCl for 2 h at 25° C., and precipitated by addition to stirring deionized (DI) water. The polymer was filtered and dried under vacuum at 100° C. for 24 h. Then, the polymer was dissolved in chloroform, passed through a 0.45 µm Teflon® filter, then isolated by precipitation in DI water. The product (A-PAES(1), referred as A-PAES if not specified) was dried at 100° C. under vacuum for 24 h.

The high molar mass linear A-PAES was synthesized via the traditional polycondensation described above with modified reaction conditions. One example case is provided as in DFDPS/BPA/DABA system for A-PAES-75. BPA (0.792 g, 3.474 mmol), DFDPS (3.757 g, 14.791 mmol), DABA (3.212 g, 10.428 mmol), $K_2CO_3$ (2.015 g, 14.599 mmol) were added to a three-neck, 250-mL flask equipped with a condenser, Dean Stark trap, nitrogen inlet/outlet, and a mechanical stirrer. DMSO (45 mL) and toluene (15 mL) were added to the flask to dissolve the monomers. The solution was heated under reflux at 135° C. for 2 h until the toluene-water azeotrope and toluene were completely removed from the reaction mixture. The reaction continued for 4-6 h at 135° C. The reaction mixture was cooled to room temperature and filtered to remove the precipitated salt. Then the clear solution was diluted with THF, passed through a 0.45 µm Teflon® filter, and precipitated by addition to stirring DI water. The polymer was filtered and freeze dried under vacuum for 24 h.

The synthesized A-PAES copolymer (1 g, 2.961 mmol allyl group for A-PAES-75), 2-(dimethylamino) ethanethiol (4.195 g, 10 equiv.), and DMPA (226.67 mg, 0.3 equiv.) were dissolved in dimethylformamide (DMF) (200 mL) to perform a post-polymerization modification via the thiol-ene click reaction. The reactor flask was purged with nitrogen for 15 min. Irradiation with UVGL-15 compact UV lamp (365 nm) was carried out for 2 h at 23° C. The solution was concentrated using a rotary evaporator, and the remaining solution was diluted with THF (5 mL) and dialyzed against THF in a dialysis tube (1 kDa MWCO) for 3 days. The THF outside the dialysis tube was exchanged with fresh THF every 2 h over the first 10 h and then every 6 h until completion. The polymer was then isolated by precipitation in DI water, and the product was dried at 100° C. under vacuum for 24 h.

To a solution of TA-PAES (1 g, 2.269 mmol TA group for TA-PAES-75) in DMF (20 mL), 1,3-propane sultone (0.277 g, 2 equiv.) was added. The solution was stirred at room temperature for 1 h and at 60° C. for 18 h. The solution was concentrated using a rotary evaporator, and the remaining solution was diluted with THF (5 mL) and dialyzed against THF in a dialysis tube (1 kDa MWCO) for 3 days. The THF outside the dialysis tube was exchanged with fresh THF every 2 h over the first 10 h and then every 6 h until completion. The polymer was then isolated by precipitation in DI water, and the product was dried at 100° C. under vacuum for 24 h. In addition, to demonstrate the suitability of the reaction conditions, a series of A-PAES polymers (A-PAES-0, A-PAES-25, A-PAES-50, and A-PAES-100) was synthesized and functionalized (with product nomenclature of PAES-co-SBAES-25, PAES-co-SBAES-50, and PAES-co-SBAES-100) in the same fashion as previously described herein.

$^1$H-NMR spectroscopy was performed on a Varian 400 MHz spectrometer using deuterated chloroform ($CDCl_3$) to determine the copolymer chemical structures. Samples were prepared as 20 mg of dried polymer dissolved in deuterated chloroform. Chemical shifts are given in ppm downfield from tetramethylsilane (TMS).

To determine the molar mass of the polymers, size exclusion chromatography (SEC) was performed using a Waters Alliance e2695 HPLC system interfaced to a light scattering detector (miniDAWN TREOS) and an Optilab T-rEX differential refractive index (dRI) detector. The mobile phase was THF Optima (inhibitor-free) at a flow rate of 1.0 mL min$^{-1}$, and samples were calibrated against Pressure Chemical Company low dispersity polystyrene standards of 30 kDa and 200 kDa using Astra v6.1 software. Then, ~1.0 mg mL$^{-1}$ filtered solutions of polymer in THF were prepared for SEC.

The PSf/PAES-co-SBAES blend membranes were prepared via the NIPS process. In a typical process, a mixture of PSf and PAES-co-SBAES (total of 1.0 g) was dissolved in THF (3.0 g) at room temperature for 6 h. The weight ratios between PAES-co-SBAES and pristine PSf were 0, 0.25, 0.68, and 1.52, corresponding with the weight percent of zwitterionic segment in the blends as 0 wt %, 2 wt %, 4 wt %, and 6 wt %, respectively (labeled as M-0, M-2, M-4, and M-6). After 6 h of sonication, the dope solution was left at room temperature for another 6 h, and then spread onto a flat glass plate with a doctor blade at a wet thickness of 100 µm, evaporated at room temperature and 20% relative humidity for 20 s. Then, the plate and partially dried solution were immersed into a coagulation bath of deionized water at 25° C. The blend membrane spontaneously lifted from the glass plate, after which it was washed thoroughly with deionized water and stored in fresh deionized water for future use.

Membrane thickness and morphology were characterized using an environmental scanning electron microscope Philips XL30 ESEM-FEG operating at 4 kV. Membrane samples were freeze-fractured using liquid nitrogen for cross-sectional examination, and sputter coated with gold before imaging. Surface hydrophilicity of the membranes was tested by water contact angle measurement (Attension Theta optical tensiometers, Biolin Scientific). Five random spots on the surface were measured for each membrane sample at room temperature and the average value was taken.

Filtration experiments were performed on 49 mm diameter membranes using a 300 mL Sterlitech HP4750 stirred, dead-end filtration cell with an effective filtration area of 14.6 cm$^2$. A Sartorius ED3202S extend precision balance connected with a LabVIEW software was used to monitor the flow rates every 3 s. All filtration tests were performed at room temperature and feed solution was stirred in 125 rpm by using a Teflon-coated magnetic stir bar to reduce concentration polarization. All tested membranes were supported by a polyester fabric support (Whatman, 47 mm). All filtration membranes were pre-pressurized under a transmembrane pressure of 8 bar for at least 30 min, and then following the filtration tests were performed with a transmembrane pressure of 4 bar. Before each filtration test was performed, deionized water was first passed through the membrane until the system remained stable for at least 30 min. Flux is the flow rate through the membrane normalized by membrane active area. Permeance is a membrane transport property that normalizes the flux with the applied transmembrane pressure, and is obtained by:

$$J_v = Q_v/A_m \quad (1)$$

$$L_p = Jv/(\Delta P - \Delta \pi) \quad (2)$$

where $J_v$ is the volumetric filtrate flux across the membrane (Lm$^{-2}$h$^{-1}$), $Q_v$ is the volume flow rate (Lh$^{-1}$), $A_m$ is the effective membrane area (14.6 cm$^2$), $\Delta P$ and $\Delta \pi$ are the hydrostatic and osmotic pressure differences across the film, respectively. $L_p$ is the permeance of the membrane (Lm$^{-2}$h$^{-1}$bar$^{-1}$).

To characterize the salt selectivity of the membranes, sodium chloride was used as the salt during filtration tests. A 1.0 g/L aqueous solution of sodium chloride was filtered through the membrane. The salt rejection was calculated by the definition:

$$R(\%) = (1 - C_P/C_F) \times 100\% \quad (3)$$

where R is the salt rejection (%), $C_P$ is the permeate concentration (g/L), and $C_F$ is the feed concentration (g/L). $C_P$ and $C_F$ were measured by an Accumet Excel XL50 conductivity meter. For each copolymer ratio, three membrane samples prepared under same conditions were tested.

Fouling tests were performed using the same filtration set-up. The fouling experiment of 0.1 g/L Bovine serum albumin (BSA) in pH 4.7±0.1 were performed. First deionized water was filtered through the membrane until the system stabilized. This pure water flux was taken as the initial flux $J_{W1}$ (L m$^{-2}$). Then the cell was filled with 0.1 g/L BSA aqueous solution in pH 4.7±0.1 (pI$_{BSA}$=4.7), and protein solution flux $J_P$ (L m$^{-2}$) was recorded. After 2 h of protein solution filtration, the cell was rinsed at least three times with deionized water and pure water flux for the washed membrane was re-measured as $J_{W2}$ (L m$^{-2}$) to determine the flux recovery ratio (FRR) and total fouling ratio ($R_t$) by Eqs. (4) and (5). The same procedure was followed for the blend membrane and the control.

$$FRR = J_{W2}/J_{W1} \times 100\% \quad (4)$$

$$R_t = (1 - J_P/J_{W1}) \times 100\% \quad (5)$$

Irreversible fouling resistance of the membranes was tested further by monitoring the adhesion of fluorescein-conjugated BSA (FITC-BSA) on the membrane active surface using an epifluorescence microscope. Specifically, 5.0 mg of FITC-BSA was dissolved in 1 mL of phosphate-buffer saline (PBS) at pH 7.4; then, 50 μL of the solution was taken and diluted to a concentration of 0.05 mg/mL. Tests were performed on membrane fragments approximately 1 cm² in area, which were adhered to the surface of a petri dish using chemical-resistant tape applied to the edges of the membrane (such that only the top surface of the membrane contacted the BSA solution). Then, 5.0 mL of the prepared FITC-BSA solution was added to fully cover the surface of the membranes, which were incubated on a rocking plate (60 rpm) for 3 h in the dark. After the solution was removed from the dish, the membrane surface was rinsed with fresh PBS for 1 min on the rocking plate (60 rpm). Then the membranes were cut and placed on a glass slide. One drop of deionized water was added on the membrane surface before a cover slip was placed on top, the combination was sealed with nail polish to avoid any evaporation of water during fluorescence imaging. The prepared sample was then observed on an inverted Axiovert 200M epifluorescence microscope (Carl Zeiss Inc., Thornwood, NY, USA). For each sample, ten spots were randomly chosen to acquire fluorescence images. The fluorescence intensity of the acquired image was processed by ImageJ software for further analysis.

To test the chemical stability of the membrane under chlorine exposure, the M-2 membrane was exposed to an aqueous solution of sodium hypochlorite at a concentration of 1.0 g/L for three hours in a sealed container; initially, concentrated HCl was added in order to adjust the pH value of the solution to 7.1. After exposure, the membrane was rinsed with deionized water twice. Then, filtration performance was evaluated before and after exposure to chlorine as described previously herein.

A number of embodiments have been described. Nevertheless, it will be understood that various modifications may be made without departing from the spirit and scope of the disclosure. Accordingly, other embodiments are within the scope of the following claims.

What is claimed is:

1. A membrane comprising:
   a polysulfone homopolymer; and
   a polysulfone copolymer represented by the formula:

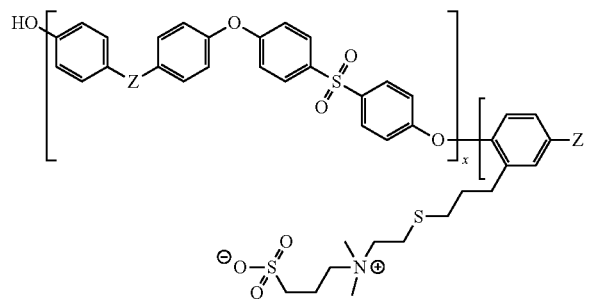

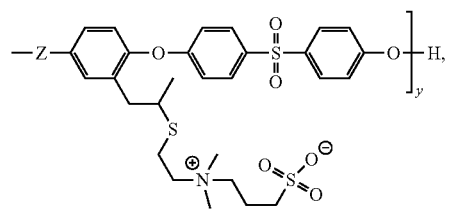

wherein each Z independently represents a single bond, a substituted carbon atom, or —SO$_2$—, and x and y represent mole percent of the arylene ether sulfone component and the sulfobetaine arylene ether sulfone component, respectively, and x+y=100.

2. The membrane of claim 1, wherein 0<y≤100.

3. The membrane of claim 2, wherein 25≤y≤100.

4. The membrane of claim 2, wherein 0<y≤25.

5. The membrane of claim 1, wherein the membrane comprises 2 wt % to 6 wt % of the sulfobetaine arylene ether sulfone component.

6. The membrane of claim 1, wherein the membrane is porous.

7. The membrane of claim 1, wherein the membrane is pore-free.

8. The membrane of claim 1, wherein the polysulfone homopolymer is zwitterion-functionalized.

9. The membrane of claim 1, wherein the arylene ether sulfone component comprises pendant allyl groups.

10. The membrane of claim 1, further comprising poly(ethylene glycol).

11. The membrane of claim 10, wherein a number average molecular weight of the poly(ethylene glycol) is about 12,000 g/mol.

12. The membrane of claim 10, wherein the membrane comprises about 3 wt % of the poly(ethylene glycol).

13. A method of forming a membrane, the method comprising:
   dissolving a polysulfone homopolymer and a zwitterionic poly(arylene ether sulfone-co-sulfobetaine arylene ether sulfone) copolymer in a solvent to yield a mixture;
   disposing the mixture on a substrate;
   at least partially drying the mixture on the substrate to yield a membrane precursor on the substrate; and
   immersing the substrate in a coagulation bath to yield the membrane, wherein the membrane is separate from the substrate,
   wherein the zwitterionic poly(arylene ether sulfone-co-sulfobetaine arylene ether sulfone) copolymer is represented by the formula:

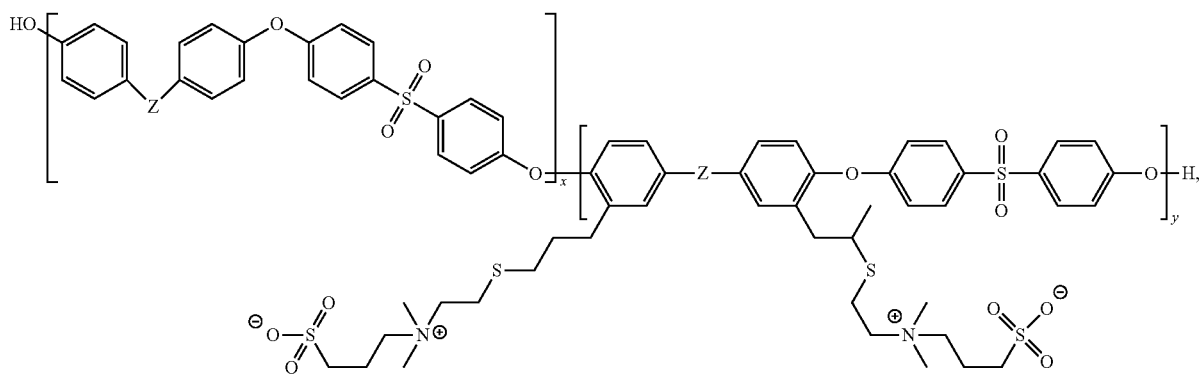

wherein each Z independently represents a single bond, a substituted carbon atom, or —SO$_2$—, and x and y represent mole percent of the arylene ether sulfone component and the sulfobetaine arylene ether sulfone component, respectively, and x+y=100.

14. The method of claim 13, wherein the solvent comprises tetrahydrofuran.

15. The method of claim 13, wherein a weight ratio of the copolymer to the homopolymer is in a range of 0.25 to 1.52.

16. The method of claim 13, wherein the sulfobetaine arylene ether sulfone component of the copolymer comprises 2 wt % to 6 wt % of a total weight of the homopolymer and the copolymer.

17. The method of claim 13, wherein the coagulation bath comprises water.

18. The method of claim 17, wherein the water comprises deionized water.

19. A polysulfone comprising:
an arylene ether sulfone component comprising pendant allyl groups, wherein the arylene ether sulfone component is formed by reacting:
a first component comprising a diphenyl sulfone;
a second component comprising a biphenol or bisphenol comprising the pendant allyl groups; and
a third component comprising a biphenol or bisphenol,
wherein the polysulfone is represented by the formula:

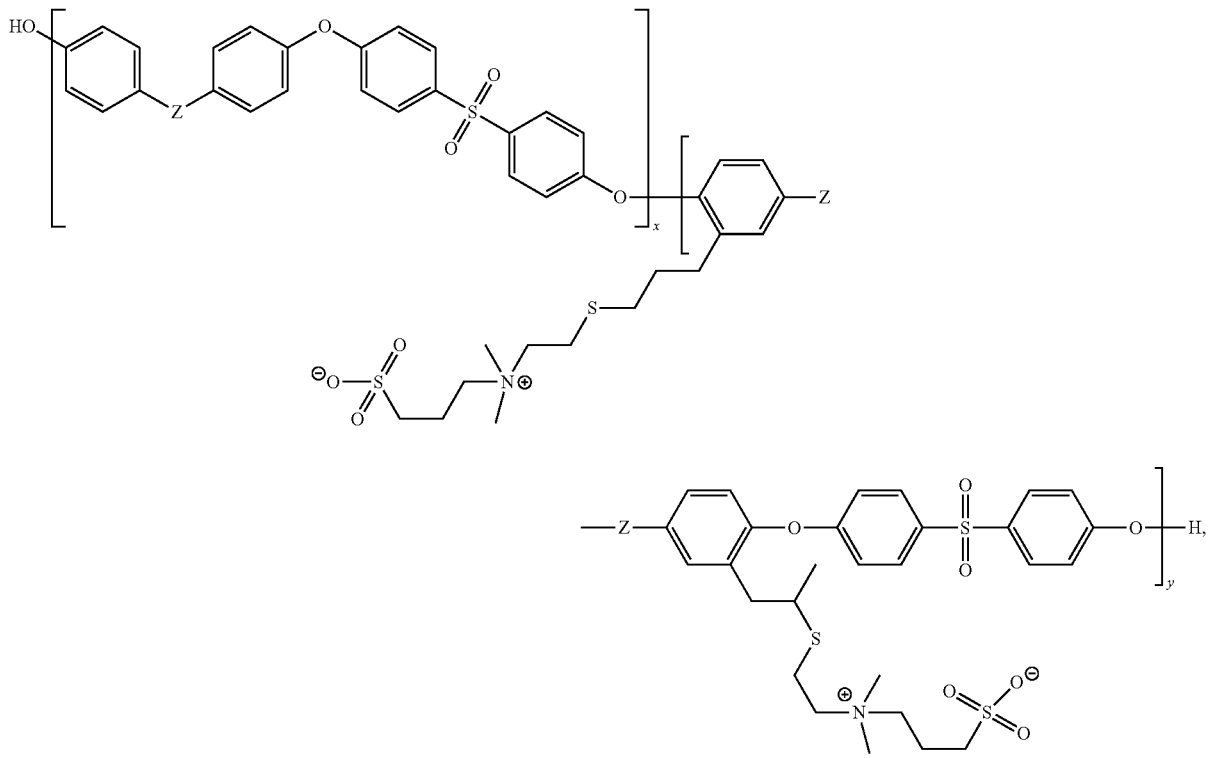

wherein each Z independently represents a single bond, a substituted carbon atom, or —SO$_2$—, and x and y represent mole percent of the arylene ether sulfone component and the sulfobetaine arylene ether sulfone component, respectively, and x+y=100.

* * * * *